J. W. F. DAVIS.
CONFECTIONER'S TABLE.
APPLICATION FILED MAR. 4, 1918.

1,291,431.

Patented Jan. 14, 1919.
2 SHEETS—SHEET 2.

J. W. F. Davis
Inventor

By Geo. P. Kimmel
Attorney

UNITED STATES PATENT OFFICE.

JOHN W. F. DAVIS, OF SPARTANBURG, SOUTH CAROLINA, ASSIGNOR TO THE PRICE CANDY CO., INC., OF SPARTANBURG, SOUTH CAROLINA.

CONFECTIONER'S TABLE.

1,291,431.  Specification of Letters Patent.  Patented Jan. 14, 1919.

Application filed March 4, 1918. Serial No. 220,239.

*To all whom it may concern:*

Be it known that I, JOHN W. F. DAVIS, a citizen of the United States, residing at Spartanburg, in the county of Spartanburg and State of South Carolina, have invented certain new and useful Improvements in Confectioners' Tables, of which the following is a specification.

This invention relates to a confectioner's table or steam vat adapted to supply heat to candy located in pans placed thereon. In the manufacture of candy, especially in that kind made in open fire kettles the candy is placed in pans and it is necessary to have the same retain its heat in order that the candy may retain its proper consistency until it may be pulled off and cut into desired shapes.

The objects of this invention are to provide a steam tight and leak proof vat which will be simple to manufacture and will operate efficiently for the purposes desired, as in a steam table of this character it is necessary to evenly distribute the heat over the entire area of the pan which receives the candy and it is the object of this invention to provide such a construction including a shallow steam table or double walled plate for supplying heat to candy pans, the table being so made that the same will be strong and able to withstand constant use and excessive heat applied thereto in which an efficient bracing member is utilized for the two-fold purpose of bracing the walls of the steam vat and at the same time permitting the even distribution of the heat by facilitating the circulation of the heating fluid employed.

Referring to the drawings illustrating one embodiment of my invention, it will be seen that, In the drawings.

Figure 1:
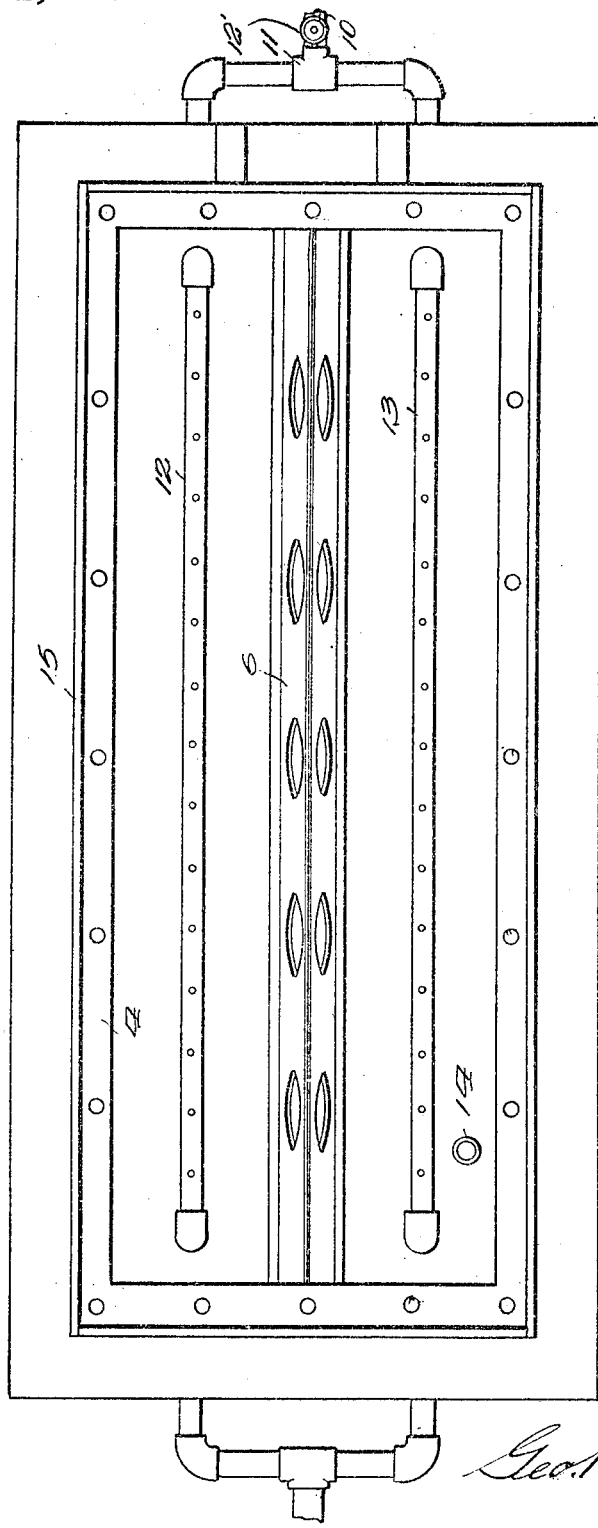
Figure 1 is a top plan view of the table.
Figure 2:
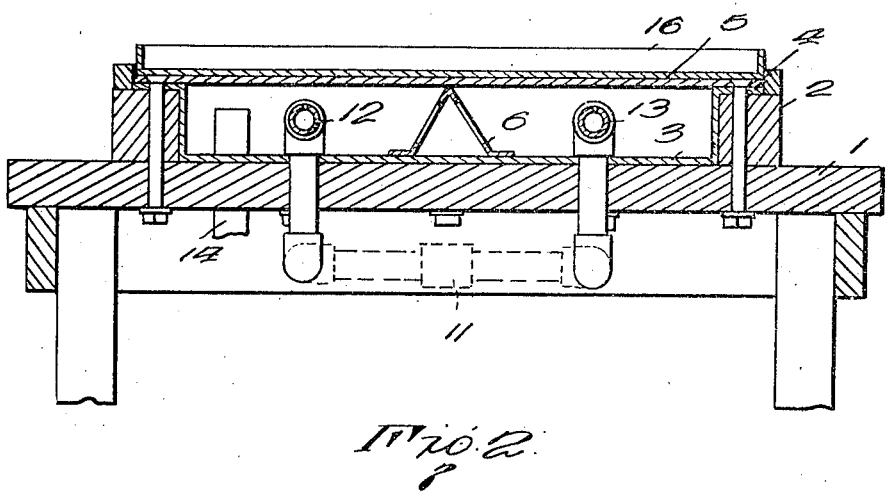
Fig. 2 is a fragmental transverse section therethrough.
Figure 3:
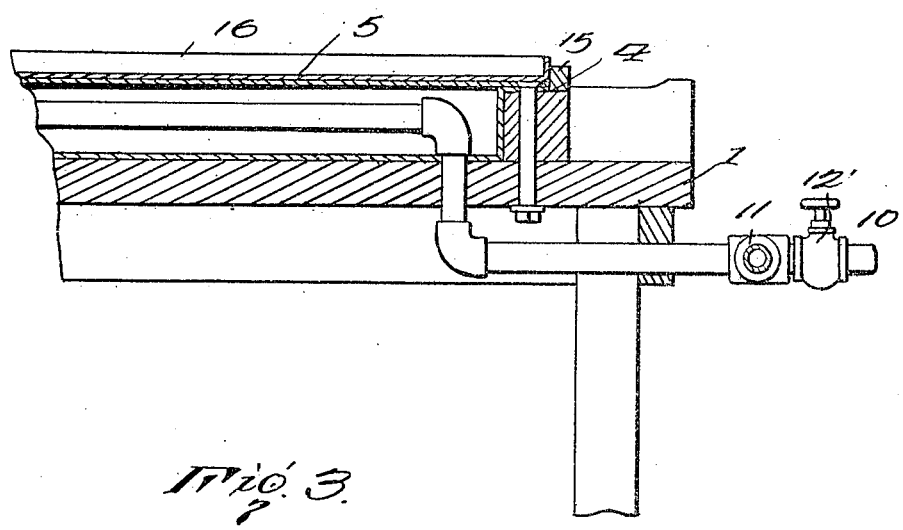
Fig. 3 is a fragmental longitudinal section therethrough.

For the purpose of illustration I have shown a table 1 upon which I have illustrated my invention as secured in any suitable manner thereto. A relatively low rectangular frame 2 is provided with a steel lining 3 therearound and this forms a shallow steam tight and leak proof receptacle which may of course be of any configuration other than rectangular if so desired. The lining 3 may be provided with outwardly extending flanges 4 overlying portions of the top surface of the frame 2. A flat top plate 5 is secured over the flanges of the lining in a steam tight manner by use of bolts extending downwardly through the top plate 5 flanges 4 of the lining 3 and the frame 2 down through the top of the table the same being secured therein by washers and nuts of any desired construction. In order to properly brace the vat as hereinbefore suggested, I have shown herein a longitudinally extending brace member in the form of a triangular rib 6. The rib 6 extends from end to end of the steam vat and is provided through its walls with heat fluid openings for a purpose more fully hereinafter set forth. Attention is called to the fact that the rib 6 extends from the top plate 5 to the bottom of the inner lining 3 thus forming an additional central supporting member for the top plate 5. The rib 6 may assume various configurations other than that illustrated herein and other types of open work constructions might be employed with the same results so long as the necessary heat fluid circulating openings are supplied therethrough.

Any character of heating fluid may be employed in my table or heating plate but I have found that the use of steam is very successful. For this purpose, an inlet pipe 10 is provided and a branch or T connection 11 connected thereto to supply steam to the separate longitudinally extending pipes 12 and 13. A suitable valve 12' may be interposed in the steam line for controlling the supply of the heating fluid. The pipes 12 and 13 extend into the chambers formed by the lining 3 on the frame 2 and the top plate 5, one being located on each side of the bracing rib 6. Each of the pipes 12 and 13 is provided with perforations through which steam can escape into the vat or steam chambers. A suitable drain pipe 14 is provided and as shown it is located with its top extending somewhat above the bottom of the hollow table and near the undersurface of the top plate 5. This permits a certain amount of water condensing from the steam to be retained in the hollow receptacle and the live steam coming therein through the pipes 11 and 12 circulates throughout any water in the receptacle and thus evenly distributes the heat over the entire undersurface of the top plate 5.

Surrounding the top edge of the steam vat on the top of the frame 2 is located a strip or retaining edge 15 to properly position the candy pan 16 on the top plate 5. It is also to be noted that the strip 15 abuts the outer edges of the flanges 4 and the plate 5 to form a seal between the frame 2, flanges 4 and plate 5, as is apparent.

The operation and use of my improved type of steam table for supplying heat to candy pans will be readily understood from the foregoing. The valve in the steam line is turned on and live steam enters the pipes 12 and 13 and issues forth the openings therein into the interior of the steam vat. By reason of the peculiar type of braces 6 used the steam can circulate over the entire area within these vats and thus supplying an even distribution of heat to the entire undersurface of the top plate 5. As soon as the steam condenses and forms water, the water is retained until it rises to the overflow or drain pipe and thus a certain amount of water may be retained within the vat. This further facilitates a proper even distribution of the heat within the steam table as the live steam entering the same from the openings in the pipes 12 and 13 causes a circulation of the water and thus efficiently contributes toward a practical and successful device of the character set forth.

It is to be understood that my invention is not limited to the precise details of construction illustrated herein, but contemplates more broadly any mechanical means or instrumentalities for obtaining the results suggested herein and the details may be widely varied without departing from the spirit and scope of my invention as set forth in the appended claim.

Having thus described my invention, what I desire to secure by Letters Patent of the United States is as follows:

In a device of the character described, in combination, a supporting base, a steam vat disposed thereon including a frame, a metallic lining forming a receptacle, flanges projecting from the upper edges of the walls of the lining and resting on portions of the top of the frame, a top plate disposed on the flanges and having the outer edges alining with the edges of the flanges, and means for securing the plate and flanges together and to the base, a pan disposed on the upper surface of the top plate, a combined pan retaining and joint sealing strip carried by the top of the frame and abutting the outer alining edges of the plate, the pan and the flanges, means for introducing steam into said vat, and means for draining the vat.

In testimony whereof, I affix my signature hereto.

JOHN W. F. DAVIS.

Copies of this patent may be obtained for five cents each, by addressing the "Commissioner of Patents, Washington, D. C."